US006630211B1

(12) United States Patent
Baumgart et al.

(10) Patent No.: US 6,630,211 B1
(45) Date of Patent: Oct. 7, 2003

(54) UTILIZATION OF TRICYCLODECANDIMETHANOL FOR PRODUCING MULTILAYER LACQUERS

(75) Inventors: Hubert Baumgart, Münster (DE); Heinz-Peter Rink, Münster (DE); Ulrike Röckrath, Senden (DE); Thomas Farwick, Billerbeck (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/913,588

(22) PCT Filed: Feb. 21, 2000

(86) PCT No.: PCT/EP00/01412

§ 371 (c)(1),
(2), (4) Date: Oct. 4, 2001

(87) PCT Pub. No.: WO00/50523

PCT Pub. Date: Aug. 31, 2000

(30) Foreign Application Priority Data

Feb. 25, 1999 (DE) .......................... 199 07 978
Feb. 3, 2000 (DE) .......................... 100 04 750

(51) Int. Cl.$^7$ .................. B32B 27/28; B32B 27/30; B32B 31/26; C08F 8/00
(52) U.S. Cl. .................. 428/31; 428/411.1; 428/423.1; 428/522; 427/379; 427/385.5; 427/407.1; 525/330.5; 525/374; 525/379; 525/384; 525/458
(58) Field of Search .................. 525/330.5, 374, 525/379, 384, 458; 427/301, 379, 385.5, 388.1, 407.1, 409; 428/31, 423.1, 480, 411.1, 522

(56) References Cited

U.S. PATENT DOCUMENTS

| 3,639,147 A | * | 2/1972 | Benefiel et al. ............. 428/216 |
| 4,181,642 A | | 1/1980 | Holle et al. .................... 260/37 |
| 4,220,679 A | | 9/1980 | Backhouse ................... 427/401 |
| 4,246,382 A | | 1/1981 | Honda et al. .................. 526/79 |
| 4,456,737 A | * | 6/1984 | DiDomenico, Jr. .......... 525/398 |
| 4,489,135 A | | 12/1984 | Drexler et al. ............ 428/423.1 |
| 4,576,868 A | | 3/1986 | Poth et al. ................ 428/423.1 |
| 4,730,020 A | | 3/1988 | Wilfinger et al. ............ 524/555 |
| 4,851,460 A | | 7/1989 | Stranghöner et al. ........ 523/400 |
| 4,880,867 A | | 11/1989 | Göbel et al. .................. 524/507 |
| 4,895,910 A | | 1/1990 | Isozaki et al. ............ 525/326.5 |
| 4,914,148 A | | 4/1990 | Hille et al. .................... 524/507 |
| 4,945,128 A | | 7/1990 | Hille et al. .................... 524/591 |
| 4,981,759 A | | 1/1991 | Nakatani et al. ............. 428/626 |
| 5,075,372 A | | 12/1991 | Hille et al. .................... 524/839 |
| 5,079,312 A | | 1/1992 | Isozaki et al. ............... 525/479 |
| 5,334,420 A | | 8/1994 | Hartung et al. .......... 427/407.1 |
| 5,342,882 A | | 8/1994 | Göbel et al. .................. 524/832 |
| 5,416,136 A | | 5/1995 | Konzmann et al. .......... 523/414 |
| 5,418,264 A | | 5/1995 | Obloh et al. ................. 523/414 |
| 5,425,970 A | | 6/1995 | Lahrmann et al. .......... 427/493 |
| 5,516,559 A | | 5/1996 | Röckrath et al. ......... 427/407.1 |
| 5,552,496 A | | 9/1996 | Vogt-Birnbrich et al. ... 525/440 |
| 5,569,705 A | | 10/1996 | Vogt-Birnbrich et al. ... 524/591 |
| 5,571,861 A | | 11/1996 | Klein et al. .................. 524/591 |
| 5,576,386 A | | 11/1996 | Kempter et al. .............. 526/88 |
| 5,601,880 A | | 2/1997 | Schwarte et al. ......... 427/407.1 |
| 5,623,016 A | | 4/1997 | Klein et al. .................. 524/591 |
| 5,654,391 A | | 8/1997 | Gobel et al. ................... 528/71 |
| 5,658,617 A | | 8/1997 | Göbel et al. .............. 427/372.2 |
| 5,691,425 A | | 11/1997 | Klein et al. .................. 525/455 |
| 5,726,258 A | | 3/1998 | Fischer et al. ................ 526/64 |
| 5,760,128 A | | 6/1998 | Baltus et al. ................. 524/591 |
| 5,965,213 A | | 10/1999 | Sacharski et al. ........... 427/475 |
| 5,998,504 A | | 12/1999 | Groth et al. .................. 523/213 |
| 6,309,707 B1 | | 10/2001 | Mayer et al. ................ 427/386 |
| 6,344,501 B1 | | 2/2002 | Sierakowski et al. ....... 523/410 |
| 6,372,875 B1 | | 4/2002 | Mayer et al. .................. 528/60 |

FOREIGN PATENT DOCUMENTS

| CA | 2102169 | 5/1994 |
| CA | 2114035 | 7/1994 |
| CA | 2073115 | 8/2001 |
| CA | 2102170 | 8/2001 |
| CA | 2079498 | 2/2002 |
| CA | 2107351 | 2/2002 |
| DE | 2 200 022 | 7/1973 |
| DE | 4328092 | 2/1995 |
| EP | 038 127 | 3/1981 |
| EP | 297576 | 1/1989 |
| EP | 531 510 B1 | 3/1992 |
| EP | 708788 | 1/1995 |
| EP | 0 785 034 A1 | 1/1997 |
| GB | 1338204 | 11/1973 |
| JP | 04 036 364 | 2/1992 |
| WO | WO9001041 | 8/1990 |
| WO | WO9113923 | 9/1991 |
| WO | WO9215405 | 9/1992 |
| WO | WO92/22615 | 12/1992 |
| WO | WO94/22968 | 10/1994 |
| WO | WO9422969 | 10/1994 |
| WO | WO95/14721 | 1/1995 |
| WO | WO96/12747 | 2/1996 |

OTHER PUBLICATIONS

English Language Abstract Cover Page Of The International Publication WO96/12747, May 1996.
English Language Abstract DE 43 28 092 A1, Feb. 1995.
English Language Abstract Cover Page Of The International Publication WO95/14721, Jun. 1995.
English Language Abstract EP 297 576, Jan. 1989.
English Language Abstract Cover Page Of The International Publication WO9222615, Dec. 1992.
English Language Abstract Cover Page Of The International Publication WO9422969, Oct. 1994.
English Abstract for WO 94/22968 On Front Page Of The International Publication, Oct. 1994.
English Language Abstract Cover Page Of The International Publication WO9215405, Sep. 1992.
English Language Abstract Cover Page Of The International Publication WO9113923, Sep. 1991.
English Language Abstract Cover Page Of The International Publication WO9001041, Feb. 1990.
English Abstract for DE 2 200 022, Jul. 1973.

* cited by examiner

Primary Examiner—Ramsey Zacharia

(57) ABSTRACT

The invention relates to the utilization of tricyclodecandimethanol for producing multilayer lacquers, in particular, multilayer transparent lacquer coatings, and as a binding agent in multilayer lacquers. The invention als relates to a coating substance, especially transparent lacquer, containing at least one binding agent, at least one cross-linking agent and tricylodecandimethanol. In addition, the invention relates to a method for improving the adherence of the intermediate layer in multilayer transparent lacquer coatings.

26 Claims, No Drawings

UTILIZATION OF TRICYCLODECANDIMETHANOL FOR PRODUCING MULTILAYER LACQUERS

The present invention relates to the novel use of tricyclodecanedimethanol both to produce and as an adhesion promoter in multicoat systems, especially multicoat clearcoats. The present invention also relates to a novel coating material, in particular a novel clearcoat material, which comprises tricyclodecanedimethanol. The present invention further relates to a novel method of improving the intercoat adhesion in multicoat clearcoats. Moreover, the invention relates to a novel multicoat system comprising a multicoat clearcoat. Furthermore, the present invention relates to a new process for producing multicoat systems which is based on the wet-on-wet technique. The present invention relates not least to the use of the novel multicoat systems especially in automotive OEM finishing, automotive refinish, and industrial coating, including container coating and coil coating.

The requirements imposed on the resistance of topcoats which are exposed to weathering, especially insolation and acid rain, and also, even more frequently, to mechanical stress, especially that produced by wash-brush cleaning installations, are becoming increasingly more stringent. This applies most particularly to vehicle finishes, which have to meet these requirements while also satisfying very high optical demands regarding gloss, surface smoothness, and color.

To date this problem has been solved by applying to the substrates a multicoat system which, in accordance with the heightened environmental compatibility requirements, is composed substantially of aqueous coating materials. In the case of metal substrates, this coating system is conventionally produced from an aqueous electrocoat material, a water-based primer-surfacer, an aqueous basecoat material, and a solventborne clearcoat material. The electrocoat material and the water-based primer-surfacer are each baked following their application, and then constitute the primer. The aqueous basecoat material is applied atop said primer and subjected to interim drying. Over this film, which is not yet fully cured, the clearcoat material is applied, after which the two films are cured together (wet-on-wet technique). Where the substrates used comprise plastics, water-based primers are conventionally employed in place of the electrocoat material.

The wet-on-wet technique for producing multicoat topcoats is described, for example, in the patents

| | | |
|---|---|---|
| US-A-3,639,147, | DE-A-33 33 072, | DE-A-38 14 853, |
| GB-A-2 012 191, | US-A-3,953,644, | EP-A-0 260 447, |
| DE-A-39 03 804, | EP-A-0 320 552, | DE-A-36 28 124, |
| US-A-4,719,132, | EP-A-0 297 576, | EP-A-0 069 936, |
| EP-A-0 089 497, | EP-A-0 195 931, | EP-A-0 228 003, |
| EP-A-0 038 127 and | DE-A-28 18 100. | |

The optical or visual appearance and the weathering stability are primarily the responsibility of the two topmost coats of the multicoat system. Thus the aqueous basecoat gives the multicoat system its color and/or optical effects such as metallic effects or interference effects, while the clearcoat provides not only scratch and etch resistance, i.e., resistance to damaging environmental substances, but also provides the appearance qualities, i.e., the gloss, brilliance, and evenness. In this system, aqueous basecoat material and clearcoat material must be very precisely matched to one another in order to produce a system having the desired advantageous profile of properties.

Aqueous basecoat materials and the corresponding coating systems which substantially meet these requirements are known from the patents EP-A-0 089 497,

| | | |
|---|---|---|
| EP-A-0 256 540, | EP-A-0 260 447, | EP-A-0 297 576, |
| WO 96/12747, | EP-A-0 523 610, | EP-A-0 228 003, |
| EP-A-0 397 806, | EP-A-0 574 417, | EP-A-0 531 510, |
| EP-A-0 581 211, | EP-A-0 708 788, | EP-A-0 593 454, |
| DE-A-43 28 092, | EP-A-0 299 148, | EP-A-0 394 737, |
| EP-A-0 590 484, | EP-A-0 234 362, | EP-A-0 234 361, |
| EP-A-0 543 817, | WO 95/14721, | EP-A-0 521 928, |
| EP-A-0 522 420, | EP-A-0 522 419, | EP-A-0 649 865, |
| EP-A-0 536 712, | EP-A-0 596 460, | EP-A-0 596 461, |
| EP-A-0 584 818, | EP-A-0 669 356, | EP-A-0 634 431, |
| EP-A-0 678 536, | EP-A-0 354 261, | EP-A-0 424 705, |
| WO 97/49745, | WO 97/49747 and | EP-A-0 401 565. |

These aqueous basecoat materials comprise, in particular, anionically stabilized polyurethanes, with neutralizing agents used including polyfunctional amines and/or amino alcohols, such as triethylamine, methylethanolamine and/or dimethylethanolamine.

In modern automotive OEM finishing and refinishing, use is nowadays made of numerous different clearcoat materials, such as the solventborne one-component (1K), two-component (2K) or multicomponent (3K, 4K) clearcoat materials, the aqueous two-component (2K) or multicomponent (3K, 4K) clearcoat materials, the powder clearcoat materials, the powder slurry clearcoat materials, or the UV clearcoat materials, especially those free from solvent or in powder form. All of these clearcoat materials have quite specific advantages which it is desired to utilize specifically for the respective intended use.

For example, one-component (1K) clearcoat materials produce multicoat systems which satisfy very stringent optical requirements and are resistant to abrasion, although the clearcoats in question are often not sufficiently stable to weathering. In contrast, the clearcoats based on two-component (2K) or multicomponent (3K, 4K) clearcoat materials, although very stable to weathering, often lack sufficient abrasion resistance.

It would therefore be desirable in principle, in a multicoat system, to combine the specific advantages of materially different clearcoats with one another in order to obtain multicoat clearcoats which, for example, are both weathering-stable and abrasion-resistant. This should be achieved, moreover, without additional effort for the user.

However, this is not easily achieved, since the combination of the known clearcoat materials to give multicoat clearcoats is accompanied by serious problems of intercoat adhesion. These problems may result in delamination not only of the topmost clearcoat but also of the one beneath it. These problems are particularly evident in automotive refinish, where, indeed, the refinish clearcoat must form a firmly adhering bond with the clearcoat of the automotive OEM coating system. To date it has been possible to solve this problem of intercoat adhesion only by sanding the clearcoat to be refinished. This operation, however, constitutes an additional work step in the coating operation, which is fundamentally disadvantageous.

It is an object of the present invention to provide a novel multicoat system which no longer has the disadvantages of the prior art but which instead not only has an outstanding profile of optical properties, or an outstanding appearance, but also possesses a high level of hardness, scratch resistance and etch resistance, with surface defects and delaminations no longer occurring. A further object of the present invention was to provide a novel process for producing multicoat systems which produces the novel multicoat systems simply, safely, and reliably.

The invention accordingly provides the novel coating material, in particular the novel clearcoat material, which comprises at least one binder, at least one crosslinking agent, and tricyclodecanedimethanol.

In the text below, the novel coating material is referred to as the "coating material of the invention".

The invention also provides the novel multicoat system on a primed or unprimed substrate, comprising (A) a basecoat, (B) a first clearcoat as intermediate coat, and (c) a second clearcoat as topmost coat, wherein at least one of the coating materials (B) and (C) employed to produce the clearcoats (B) and (C) comprises tricyclodecanedimethanol in effective amounts.

In the text below, the novel, highly scratch-resistant multicoat system is referred to as the "multicoat system of the invention".

The invention further provides the novel process for producing a multicoat system, said process comprising at least the following steps:

(I) applying a basecoat material (A) to a primed or unprimed substrate, (II) drying the applied basecoat material (A), (III) applying a first clearcoat material (B), (IV) curing together the films (A) and (B) applied in steps (I) and (III) (wet-on-wet technique), (V) applying a second clearcoat film (C), materially different from the first clearcoat film (B), to the clearcoat film (B) cured in step (IV), and (VI) curing the clearcoat film (C) applied in step (V) or alternatively (I) applying the basecoat material (A) to a primed or unprimed substrate, (II) drying the applied basecoat material (A), (III) applying the first clearcoat material (B), (IV) drying the applied clearcoat material (B), (V) applying a second clearcoat film (C) to the clearcoat film (B) dried in process step (IV), and (VI) curing together the films (A), (B), and (C) (wet-on-wet technique), wherein at least one of the coating materials (B) and (C) employed to produce the clearcoats (B) and (C) comprises tricyclodecanedimethanol in effective amounts.

In the text below, the novel process for producing a multicoat system is referred to for the sake of brevity as the "process of the invention".

In the light of the prior art it was surprising and unforeseeable for the skilled worker that the object on which the present invention is based might be achieved with the aid of the innovative use of tricyclodecanedimethanol in the context of the multicoat system of the invention and of the process of the invention. A particular surprise was that, despite the multicoat construction of the clearcoat, problems of intercoat adhesion and hence delamination no longer occur. Even more surprising was that, on the basis of the innovative use of tricyclodecanedimethanol, it becomes possible to vary the clearcoats (B) and (C) widely in material terms, so that a very wide variety of advantageous profiles of properties may be formulated in a simple and at the same time elegant manner. As a result, the multicoat systems of the invention can be adapted with particular simplicity and precision to the requirements of the respective intended use.

The key constituent of the coating material of the invention, especially of the clearcoat material of the invention, is tricyclodecanedimethanol. Furthermore, the coating material of the invention comprises at least one binder and at least one crosslinking agent.

The tricyclodecanedimethanol content in this case may vary widely. In accordance with the invention, however, it is of advantage if amounts of from 0.2 to 20% by weight, preferably from 1.0 to 7.0% by weight, and in particular from 2.0 to 5.0% by weight are employed, based in each case on the coating material of the invention.

Suitable binders in accordance with the invention are all oligomers and polymers as customarily employed as binders in the field of coatings. Particularly suitable are binders as employed in clearcoat materials.

Accordingly, suitable crosslinking agents in accordance with the invention are all compounds as customarily employed in the field of coatings. Particularly suitable are crosslinking agents as employed in clearcoat materials.

The coating material of the invention is therefore preferably used as a clearcoat material, in particular as a one-component (1K), solventborne two-component (2K) or multicomponent (3K, 4K) clearcoat material, aqueous two-component (2K) or multicomponent (3K, 4K) clearcoat material, powder clearcoat material, powder slurry clearcoat material, or UV clearcoat material, in particular as a solvent-free or powder-form UV clearcoat material.

The coating material of the invention may be used on its own to produce coatings. For example, it may serve to coat primed or unprimed metal, glass, wood, plastic or paper with a single-coat or with a multicoat clearcoat.

The particular advantages of the coating material of the invention are manifested to a particular extent, however, in the context of its use to produce the multicoat systems of the invention.

For the multicoat system of the invention it is important that at least two, preferably two, clearcoats are applied one above the other. It is possible in principle in this context to use one coating material of the invention; that is, it is possible that the clearcoats do not differ materially from one another.

In accordance with the invention, however, it is of advantage if the clearcoats do differ materially from one another, i.e., if at least one first clearcoat (B) and one second clearcoat (C) are used, since in this case the inventively desired combination of the advantageous properties of different clearcoat materials is the result.

In this case, at least one clearcoat (B) or the clearcoat (C) is produced from a coating material of the invention. Tricyclodecanedimethanol is present in effective amounts, in particular in the amounts indicated above, in the clearcoat material (B) used to produce the clearcoat (B) or in the clearcoat material (C) used to produce the clearcoat (C). In accordance with the invention it is of advantage if tricyclodecanedimethanol is present in the clearcoat material (B) of the invention.

In accordance with the invention, however, the clearcoat materials (B) and (C) may comprise coating materials of the invention which differ materially from one another.

The variant to which preference will be given in each individual case depends on the desired profile of properties of the multicoat system of the invention and on the seriousness of the problems of intercoat adhesion that must be solved.

The inventively preferred basis of the coating materials of the invention therefore comprises all customary and known clearcoat materials which are cured thermally and/or with actinic radiation. In the context of the present invention, actinic radiation means electron beams and UV radiation, especially UV radiation.

In the binders and in the crosslinking agents, the clearcoat materials comprise reactive functional groups which undergo crosslinking reactions with one another (principle of complementary groups).

Examples of suitable complementary reactive functional groups for use in accordance with the invention are compiled in the overview below. In the overview, the variable R represents an acyclic or cyclic aliphatic radical, an aromatic radical and/or an aromatic-aliphatic (araliphatic) radical; the variables $R^1$ and $R^2$ represent identical or different aliphatic radicals or are linked with one another to form an aliphatic or heteroaliphatic ring.

| Overview: Examples of complementary functional groups in the binder and crosslinking agent or crosslinking agent and binder | |
|---|---|
| —SH | —C(O)—OH |
| —NH$_2$ | —C(O)—O—C(O)— |
| —OH | —NCO |
|  | —NH—C(O)—OR |
|  | —CH$_2$—OH |
|  | —CH$_2$—O—CH$_3$ |
|  | —NH—C(O)—CH(—C(O)OR)$_2$ |
|  | —NH—C(O)—CH(—C(O)OR)(—C(O)—R) |
|  | —NH—C(O)—NR$^1$R$^2$ |
|  | =Si(OR)$_2$ |
|  | —CH—CH$_2$ (epoxide) |
| —C(O)—OH | —CH—CH$_2$ (epoxide) |
| —O—C(O)—CR=CH$_2$ | —OH |
| —O—CR=CH$_2$ | —NH$_2$ |
|  | —C(O)—CH$_2$—C(O)—R |
|  | —CH=CH$_2$ |

Examples of suitable one-component (1K), two-component (2K) or multicomponent (3K, 4K) clearcoat materials are known, for example, from the patents DE-A-42 04 518,

| US-A-5,474,811, | US-A-5,356,669, | US-A-5,605,965, |
| WO 94/10211, | WO 94/10212, | WO 94/10213, |
| EP-A-0 594 068, | EP-A-0 594 071, | EP-A-0 594 142, |
| EP-A-0 604 992, | WO 94/22969, | EP-A-0 596 460 and |
| WO 92/22615. | | |

One-component (1K) clearcoat materials comprise, in particular, hydroxyl-containing binders and crosslinking agents such as blocked polyisocyanates, tris(alkoxycarbonylamino)triazines and/or amino resins. In another variant, they comprise as binders polymers containing lateral carbamate and/or allophanate groups and carbamate- and/or allophanate-modified amino resins.

Two-component (2K) or multicomponent (3K, 4K) clearcoat materials conventionally comprise as key constituents hydroxyl-containing binders and polyisocyanate crosslinking agents, which are stored separately until they are used.

Examples of suitable binders for these clearcoat materials are oligomers and/or polymers containing at least two lateral or terminal carbamate groups and/or allophanate groups of the formulae:

—O—(CO)—NH$_2$ —O—(CO)—NH—(CO)—NH$_2$

Suitable oligomers and/or polymers include in principle all customary and known oligomers or polymers. Examples of suitable oligomers and polymers are linear and/or branched and/or block, comb and/or random copolymers of ethylenically unsaturated monomers, especially poly(meth)acrylates, and also polyesters, alkyds, polyurethanes, acrylated polyurethanes, acrylated polyesters, polylactones, polycarbonates, polyethers, epoxy resin-amine adducts, (meth)acrylatediols, partially saponified polyvinyl esters or polyureas, of which the copolymers of ethylenically unsaturated monomers, especially poly(meth)acrylates, are particularly advantageous and are therefore used with particular preference.

The carbamate group may be introduced by incorporating monomers containing these groups. Examples of suitable such monomers are ethylenically unsaturated monomers containing a carbamate group or an allophanate group.

Examples of suitable ethylenically unsaturated monomers which contain a carbamate group are described in the patents EP-A-0 675 141, U.S. Pat. No. 3,479,328, U.S. Pat. No. 3,674,838, U.S. Pat. No. 4,126,747, U.S. Pat. No. 4,279,833, and U.S. Pat. No. 4,340,497.

Alternatively, the carbamate group may be introduced into the oligomers and/or polymers by means of polymer-analogous reactions. Examples of suitable such methods are known from the patents U.S. Pat. No. 4,758,632, U.S. Pat. No. 4,301,257, and U.S. Pat. No. 2,979,514.

Examples of poly(meth)acrylates for use with particular preference are known from the patents U.S. Pat. No. 5,474,811,

| US-A-5,356,669, | US-A-5,605,965, | WO 94/10211, |
| WO 94/10212, | WO 94/10213, | EP-A-0 594 068, |
| EP-A-0 594 071, and | EP-A-0 594 142. | |

In order to introduce allophanate groups, oligomers and polymers which have at least two, preferably at least three, primary and/or secondary, but especially primary, hydroxyl groups are transallophanatized with alkyl and aryl allophanates at from 30 to 200° C., preferably from 50 to 160° C., with particular preference from 60 to 150° C., and in particular from 80 to 140° C. The reaction is carried out in solution or without solvent, preferably in solution. It is advisable to add customary and known inhibitors such as trialkyl phosphites, especially triisodecyl phosphite, to the reaction mixture. It is also of advantage to use customary and known transesterification catalysts such as tin compounds, especially dibutyltin dioxide.

Examples of suitable allophanates for use in accordance with the invention are methyl, ethyl, propyl, butyl, pentyl or phenyl allophanate, of which methyl allophanate and ethyl allophanate are particularly advantageous and are therefore used with particular preference in accordance with the invention.

As oligomers and polymers for use in accordance with the invention which have at least two, preferably at least three, primary and/or secondary, especially primary, hydroxyl groups, those which are suitable include, preferably, linear and/or branched and/or block, comb and/or random copolymers of ethylenically unsaturated monomers, especially poly(meth)acrylates, and also polyesters, oligomeric polyols, alkyds, polyurethanes, acrylated polyurethanes, acrylated polyesters, polylactones, polycarbonates, polyethers, epoxy resin-amine adducts, (meth)acrylatediols, partially saponified polyvinyl esters, polyureas, oligomeric polyols, which are obtainable by hydroformylation and subsequent hydrogenation from oligomers themselves obtained by metathesis reactions of acyclic monoolefins and cyclic monoolefins; or aliphatic polyols, of which the copolymers of ethylenically unsaturated monomers, especially the poly(meth)acrylates, are particularly advantageous and are therefore used with particular preference.

Besides the hydroxyl groups, the oligomers and polymers mentioned may include other functional groups such as acryloyl, ether, amide, imide, thio, carbonate or epoxide groups.

Further especially suitable binders for the one-component (1K), two-component (2K) or multicomponent (3K, 4K) clearcoat materials are polyacrylate resins having an OH number of from 80 to 200 mg KOH/g and an acid number<20 mg KOH/g. Preferably, the polyacrylate resins have a number-average molecular weight Mn of from 1 500 to 30 000, preferably from 2 000 to 15 000 and in particular from 2 500 to 5 000.

Particular preference is given to the use of polyacrylate resins obtainable by copolymerizing the following monomers in an organic solvent or a solvent mixture and in the presence of at least one polymerization initiator, and in the presence or absence of regulators:

(a1) a (meth)acrylic ester which is different from but copolymerizable with (a2), (a3), (a4), (a5), (a6) and, (a7) and is substantially free from acid groups, or a mixture of such monomers, (a2) an ethylenically unsaturated monomer which is copolymerizable with (a1), (a3), (a4), (a5), (a6), and (a7) but different from (a5), carries at least one hydroxyl group per molecule, and is substantially free from acid groups, or a mixture of such monomers, (a3) an ethylenically unsaturated monomer which is copolymerizable with (a1), (a2), (a4), (a5), (a6), and (a7) and carries per molecule at least one acid group which can be converted into the corresponding acid anion group, or a mixture of such monomers, (a4) if desired, one or more vinylaromatic hydrocarbons, (a5) if desired, at least one reaction product of acrylic acid and/or methacrylic acid with the glycidyl ester of an alpha-branched monocarboxylic acid having 5 to 18 carbon atoms per molecule (e.g., the glycidyl esters available commercially under the name Cardura®) or, instead of the reaction product, an equivalent amount of acrylic and/or methacrylic acid which is then reacted, during or after the polymerization reaction, with the glycidyl ester of an alpha-branched monocarboxylic acid (e.g., the glycidyl esters available commercially under the name Cardura®) having 5 to 18 carbon atoms per molecule, (a6) at least one polysiloxane macromonomer described in detail below and intended for use in accordance with the invention, and (a7) if desired, an ethylenically unsaturated monomer which is different from but copolymerizable with (a1), (a2), (a3), (a4), (a5), and (a6) and is substantially free from acid groups, or a mixture of such monomers, the nature and amount of (a1), (a2), (a3), (a4), (a5), (a6), and (a7) being selected such that the polyacrylate resin has the desired OH number, acid number, and the desired molecular weight.

To prepare the polyacrylate resins used in accordance with the invention, the monomer (a1) used may comprise any ester of (meth)acrylic acid which is copolymerizable with (a2), (a3), (a4), (a5), (a6), and (a7) and is substantially free from acid groups, or a mixture of such (meth)acrylic esters. Examples are alkyl acrylates and alkyl methacrylates having up to 20 carbon atoms in the alkyl radical, such as methyl, ethyl, propyl, n-butyl, sec-butyl, tert-butyl, hexyl, ethylhexyl, stearyl and lauryl acrylate or methacrylate or cycloaliphatic (meth)acrylic esters, such as cyclohexyl (meth)acrylate, isobornyl (meth)acrylate, dicyclopentadienyl (meth)acrylate and tert-butyl-cyclohexyl (meth)acrylate, for example.

As monomer (a1) it is also possible to use ethyl triglycol (meth)acrylate and methoxyoligoglycol (meth)acrylate having a number-average molecular weight Mn of preferably 550, or other ethoxylated and/or propoxylated, hydroxyl-free (meth)acrylic acid derivatives.

As monomer (a2) it is possible to use ethylenically unsaturated monomers which are copolymerizable with (a1), (a3), (a4), (a5), (a6), and (a7) but different from (a5), carry at least one hydroxyl group per molecule, and are substantially free from acid groups, or a mixture of such monomers. Examples are hydroxyalkyl esters of acrylic acid, methacrylic acid or another alpha,beta-ethylenically unsaturated carboxylic acid. These esters may derive from an alkylene glycol, which is esterified with the acid, or may be obtained by reacting the acid with an alkylene oxide. As monomer (a2) it is preferred to use hydroxyalkyl esters of acrylic acid or methacrylic acid in which the hydroxyalkyl group contains up to 20 carbon atoms, reaction products of cyclic esters, such as epsilon-caprolactone, for example, and these hydroxyalkyl esters, or mixtures of these hydroxyalkyl esters and/or epsilon-caprolactone-modified hydroxyalkyl esters.

Examples of hydroxyalkyl esters of this kind are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, methylpropanediol monoacrylate, methylpropanediol monomethacrylate, hydroxystearyl acrylate, and hydroxystearyl methacrylate. Corresponding esters of other unsaturated acids, such as ethacrylic acid, crotonic acid and similar acids having up to about 6 carbon atoms per molecule, for example, may also be used.

It is additionally possible as monomer (a2) to use olefinically unsaturated polyols. Preferred polyacrylate resins are obtained if trimethylolpropane monoallyl ether is used, at least in part, as monomer (a2). The fraction of trimethylolpropane monoallyl ether is usually from 2 to 10% by weight, based on the overall weight of the monomers (a1) to (a7) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular may be used as sole hydroxyl-containing monomers, but in particular may be used proportionately in combination with other of the abovementioned hydroxyl-containing monomers (a2).

As monomer (a3) it is possible to use any ethylenically unsaturated monomer which is copolymerizable with (a1), (a2), (a4), (a5), (a6), and (a7) and carries at least one acid group, preferably a carboxyl group, per molecule, or a mixture of such monomers. As monomer (a3) it is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid and itaconic acid. Furthermore, it is possible, for example, to use ethylenically unsaturated sulfonic or phosphonic acids, and/or their partial esters, as monomer (a3). As monomer (a3) it is also possible to use mono(meth)acryloyloxyethyl maleate, succinate, and phthalate.

As optional monomers (a4), use is made of vinylaromatic hydrocarbons, such as styrene, alpha-alkylstyrenes, and vinyltoluene.

As optional monomers (a5), use is made of the reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As monomer (a5) it is preferred to use the reaction product of acrylic and/or methacrylic acid with the glycidyl ester of Versatic acid. This glycidyl ester is available commercially under the name "Cardura® E10".

Particular preference, owing to their ready availability, is given to the use of vinyl esters of saturated aliphatic monocarboxylic acids having 9 to 11 carbon atoms which are branched on the alpha carbon atom.

For the present invention it is important that the polyacrylate resins (A) contain at least one polysiloxane macromonomer (a6) in copolymerized form.

Suitable polysiloxane macromonomers (a6) are those having a number-average molecular weight Mn of from 1 000 to 40 000, preferably from 2 000 to 20 000, with particular preference from 2 500 to 10 000, and in particular from 3 000 to 7 000 daltons and containing on average from 0.5 to 2.5, preferably from 0.5 to 1.5, ethylenically unsaturated double bonds per molecule.

Suitable polysiloxane macromonomers are, for example, those described in DE-A-38 07 571 on pages 5 to 7, in DE-A-37 06 095 in columns 3 to 7, in EP-B-0 358 153 on pages 3 to 6, and in U.S. Pat. No. 4,754,014 in columns 5 to 9. Furthermore, other acryloyloxysilane-containing vinyl monomers having the abovementioned molecular weights and ethylenically unsaturated double bond contents are also suitable, examples being compounds preparable by reacting hydroxy-functional silanes with epichlorohydrin and then reacting that reaction product with methacrylic acid and/or hydroxyalkyl esters of (meth)acrylic acid.

Particularly preferred compounds used as monomers (a6) are the polysiloxane macromonomers cited in DE-A 44 21 823.

Examples of polysiloxane macromonomers suitable as monomers (a6) are also the compounds specified in the international patent application having the publication number WO 92/22615 on page 12, line 18 to page 18, line 10.

The polysiloxane macromonomers (a6) are available on the market and are sold, for example, under the brand name Marubeni$^R$ AK5 by the company Toagosei.

The amount of the polysiloxane macromonomer(s) (a6) used is from 0.1 to 20% by weight, preferably from 1 to 15% by weight, with particular preference from 2 to 8% by weight, and in particular from 3 to 7% by weight, based in each case on the overall weight of the monomers used to prepare the polyacrylate (a).

As optional monomers (a7) it is possible to use any ethylenically unsaturated monomers which are different from but copolymerizable with (a1), (a2), (a3), (a4), (a5), and (a6) and are substantially free from acid groups, or mixtures of such monomers.

As monomers (a7) it is possible to use one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst: the olefins may be cracking products of paraffinic hydrocarbons, such as mineral oil fractions, and may include both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared from the acids in conventional manner, for example, by reacting the acid with acetylene.

Acrylate resins used with particular preference are obtained by copolymerizing
- (a1) from 5 to 80% by weight, preferably from 10 to 70% by weight, of the monomers (a1),
- (a2) from 3 to 45% by weight, preferably from 15 to 35% by weight, of the monomers (a2),
- (a3) from 0.1 to 15% by weight, preferably from 0.5 to 5% by weight, of the monomers (a3),
- (a4) up to 50% by weight, preferably from 15 to 45% by weight, of the monomers (a4),
- (a5) up to 50% by weight, preferably from 15 to 35% by weight, of the monomers (a5),
- (a6) from 0.1 to 20% by weight, preferably from 1 to 15% by weight, of the monomers (a6), and
- (a7) up to 30% by weight, preferably up to 25% by weight, of the monomers (a7),
    the sum of the weight fractions of the monomers (a1) to (a7) amounting in each case to 100% by weight.

The polyacrylate resins used in accordance with the invention are prepared without solvent or, advantageously, in an organic solvent or solvent mixture and in the presence of at least one polymerization initiator and, if desired, of a regulator. Organic solvents, polymerization initiators, and regulators used are the solvents, regulators, and polymerization initiators that are customary for the preparation of polyacrylate resins. The solvents here may participate in the reaction with the crosslinking agent and may therefore act as reactive diluents.

Examples of suitable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate, and 3-methyl-3-methoxybutanol, and also derivatives based on propylene glycol, e.g., ethyl ethoxypropionate, isopropoxypropanol, methoxypropyl acetate, and the like.

Examples of suitable reactive diluents are oligomeric polyols which are obtainable by hydroformylation and subsequent hydrogenation from oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene;

examples of suitable acyclic monoolefins are contained in hydrocarbon mixtures which are obtained in petroleum processing by cracking (C$_5$ cut); examples of suitable oligomeric polyols for use in accordance with the invention have a hydroxyl number (OHN) of from 200 to 450, a number-average molecular weight Mn of from 400 to 1 000, and a mass-average molecular weight M$_W$ of from 600 to 1 100.

Further examples of suitable reactive diluents are branched, cyclic and/or acyclic C$_9$–C$_{16}$ alkanes functionalized with at least two hydroxyl groups, especially diethyloctanediols, and also cyclo-hexanedimethanol, neopentyl glycol hydroxypivalate, neopentyl glycol, trimethylolpropane, and pentaerythritol.

Further examples of suitable reactive diluents are dendrimers or hyperbranched compounds which are prepared from tetrols as compounds forming the central groups, dicarboxylic acids and/or their anhydrides, and Versatic$^R$ acid glycidyl esters.

Examples of suitable polymerization initiators are initiators which form free radicals, such as tert-butyl peroxyethylhexanoate, benzoyl peroxide, azobisisobutyronitrile, and tert-butyl perbenzoate, for example. The initiators are used preferably in an amount of from 2 to 25% by weight, with particular preference from 4 to 10% by weight, based on the overall weight of the monomers.

Examples of suitable regulators that may be mentioned include mercaptans, such as mercaptoethanol, thioglycolic esters and chlorinated hydrocarbons, and the like. The regulators are used preferably in an amount of from 0.1 to 15% by weight, with particular preference from 0.5 to 5% by weight, based on the overall weight of the monomers.

The polymerization is judiciously conducted at a temperature of from 80 to 160 degrees C., preferably from 110 to 160° C. In this context, the methods of continuous or batchwise copolymerization under atmospheric or superatmospheric pressure in stirred tanks, autoclaves, tube reactors or Taylor reactors, these methods being customary and known in the polymers field, are employed.

Examples of suitable (co)polymerization processes for the preparation of the acrylate resins (A) are described in the patents

*DE-A-*197 09 465,

*DE-A-*195 24 182,

EP-A-0 554 783, WO 95/27742, and WO 82/02387.

Taylor reactors are advantageous.

Taylor reactors, which serve to convert substances under the conditions of Taylor flow, are known. They consist substantially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta.

Besides the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i v^{-1} (d/r_i)^{1/2} \qquad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in this context are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

Examples of suitable crosslinking agents for the one-component (1K) clearcoat materials are amino resins, resins or compounds containing anhydride groups, resins or compounds containing epoxide groups, tris (alkoxycarbonylamino)triazines, resins or compounds containing siloxane groups, resins or compounds containing carbonate groups, blocked and/or unblocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, as described by the European patent EP-A-0 596 460.

Crosslinking agents of this kind are well known to the skilled worker and are offered as commercial products by numerous companies.

In this context it is possible to use any amino resin suitable for topcoat materials or transparent clearcoat materials, or a mixture of such amino resins. Particularly suitable are the customary and known amino resins some of whose methylol and/or methoxymethyl groups have been defunctionalized by means of carbamate groups or allophanate groups. Crosslinking agents of this kind are described in the patents U.S. Pat. No. 4,710,542 and EP-B-0 245 700 and in the article by B. Singh and coworkers, "Carbamyl-methylated Melamines, Novel Crosslinkers for the Coatings Industry" in Advanced Organic Coatings Science and Technology Series, 1991, volume 13, pages 193 to 207.

Examples of suitable polyepoxides are, in particular, all known aliphatic and/or cycloaliphatic and/or aromatic polyepoxides, examples being those based on bisphenol A or bisphenol F. Further examples of suitable polyepoxides are those available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol® EX-512 (polyglycerol polyglycidyl ether) and Denacol® EX-521 (polyglycerol polyglycidyl ether), for example.

The suitable tris(alkoxycarbonylamino)triazines have the following formula:

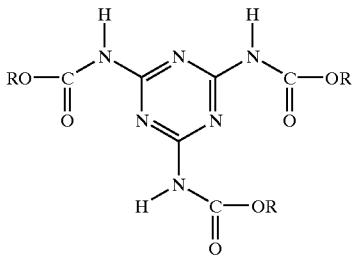

Examples of suitable tris(alkoxycarbonylamino) triazines are described in the patents U.S. Pat. No. 4,939,213, U.S. Pat. No. 5,084,541, and EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Examples of suitable siloxanes are siloxanes containing at least one trialkoxy- or dialkoxysilane group such as trimethoxysiloxane.

An example of a suitable polyanhydride is polysuccinic anhydride.

Examples of suitable beta-hydroxyalkylamides are N,N,N',N'-tetrakis(2-hydroxyethyl)adipamide and N,N,N',N'-tetrakis(2-hydroxypropyl)adipamide.

Further examples of suitable crosslinking agents are the blocked polyisocyanates.

Examples of suitable blocking agents are the blocking agents known from the U.S. Pat. No. 4,444,954:

i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonic esters and acetoacetic esters, or dimethylpyrazole and succinimide.

Examples of suitable organic polyisocyanates for blocking are, in particular, the so-called paint polyisocyanates, containing isocyanate groups attached to aliphatic, cycloaliphatic, araliphatic and/or aromatic moieties. Preference is given to polyisocyanates containing from 2 to 5 isocyanate groups per molecule and having viscosities from 100 to 10 000, preferably from 100 to 5 000. Furthermore, the polyisocyanates may have been hydrophilically or hydrophobically modified in a customary and known manner.

Further examples of suitable polyisocyanates for blocking are described in Methoden der organischen Chemie, Houben-Weyl, volume 14/2, 4th edition, Georg Thieme Verlag, Stuttgart 1963, pages 61 to 70, and by W. Siefken, Liebigs Annalen der Chemie, volume 562, pages 75 to 136. Suitable examples include the isocyanato-containing polyurethane prepolymers which may be prepared by reacting polyols with an excess of polyisocyanates and which are preferably of low viscosity.

Further examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. Preference is given to the use of aliphatic or cycloaliphatic polyisocyanates, especially hexamethylene diisocyante, dimerized and trimerized hexamethylene diisocyanate, isophorone diisocyanate, dicyclohexylmethane 2,4'-diisocyanate, dicyclohexyl-methane 4,4'-diisocyanate, diisocyanates derived from dimeric fatty acids, as sold under the commercial designation DDI 1410 by the company Henkel and described in the patents WO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis-(3-isocyanatoprop-1-yl)cyclohexane or 1,2-, 1,4- or 1,3-bis(4-isocyanatobut-1-yl)cyclohexane, 1,8-diiso-cyanato-4-isocyanatomethyloctane, 1,7-diisocyanato-4-isocyanatomethylheptane or 1-isocyanato-2-(3-isocyanatopropyl)cyclohexane or mixtures of these polyisocyanates.

Very particular preference is given to mixtures of polyisocyanates based on hexamethylene diisocyanate and containing uretdione and/or isocyanurate and/or allophanate groups, as formed by catalytic oligomerization of hexamethylene diisocyanate using appropriate catalysts.

Examples of suitable crosslinking agents for the two-component (2K) or multicomponent (3K, 4K) clearcoat materials are the abovementioned, unblocked polyisocyanates.

Examples of suitable powder clearcoat materials are, for example, those known from the German patent DE-A-42 22 194 or from the BASF Lacke+Farben AG product information bulletin "Pulverlacke" [Powder coatings], 1990.

The key constituents of powder clearcoat materials are, conventionally, binders containing epoxide groups and polycarboxylic acid crosslinking agents, and/or carboxyl-containing binders and compounds or resins containing at least two epoxide groups as crosslinking agents.

Examples of suitable binders containing epoxide groups are polyacrylate resins containing epoxide groups, preparable by copolymerizing, especially in a Taylor reactor, at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Polyacrylate resins of this kind containing epoxide groups are known, for example, from the patents EP-A-0 299 420, DE-B-22 14 650, DE-B-27 49 576, U.S. Pat. No. 4,091,048 and U.S. Pat. No. 3,781,379.

Examples of suitable monomers which contain no epoxide group in the molecule are alkyl esters of acrylic and methacrylic acid, especially methyl acrylate, methyl methacrylate, ethyl acrylate, ethyl methacrylate, n-butyl acrylate, n-butyl methacrylate, secondary-butyl acrylate, secondary-butyl methacrylate, tert-butyl acrylate, tert-butyl methacrylate, neopentyl acrylate, neopentyl methacrylate, 2-ethylhexyl acrylate or 2-ethylhexyl methacrylate; amides of acrylic acid and methacrylic acid, especially acrylamide and methacrylamide; vinylaromatic compounds, especially styrene, methylstyrene or vinyltoluene; the nitrites of acrylic acid and methacrylic acid; vinyl halides and vinylidene halides, especially vinyl chloride or vinylidene fluoride; vinyl esters, especially vinyl acetate and vinyl propionate; vinyl ethers, especially n-butyl vinyl ether; or hydroxyl-containing monomers, especially hydroxyethyl acrylate, hydroxyethyl methacrylate, hydroxypropyl acrylate, hydroxypropyl methacrylate, 4-hydroxybutyl acrylate or 4-hydroxybutyl methacrylate.

Examples of suitable epoxy-functional monomers for use according to the invention are glycidyl acrylate, glycidyl methacrylate, and allyl glycidyl ether.

The polyacrylate resin containing epoxide groups normally has an epoxide equivalent weight of from 400 to 2,500, preferably from 420 to 700, a number-average molecular weight Mn (determined by gel permeation chromatography using a polystyrene standard) of from 2 000 to 20 000, preferably from 3 000 to 10 000, and a glass transition temperature Tg of from 30 to 80, preferably from 40 to 70, with particular preference from 40 to 60, and in particular from 48 to 52° C. (measured by means of differential scanning calorimetry (DSC)).

Examples of suitable crosslinking agents for these polyacrylate resins containing epoxide groups are polycarboxylic acids, especially saturated, straight-chain, aliphatic dicarboxylic acids having 3 to 20 carbon atoms in the molecule. Instead of or in addition to them it is also possible to use carboxy-functional polyesters. Very particular preference is given to using dodecane-1,12-dicarboxylic acid.

Examples of suitable carboxyl-containing binders for the powder clearcoat materials are the above-described carboxyl-containing binders.

Examples of suitable crosslinking agents, containing epoxide groups, for these binders are the above-described binders containing epoxide groups or low molecular mass compounds containing at least two glycidyl groups, especially pentaerythritol tetraglycidyl ether or triglycidyl isocyanurate.

Furthermore, the powder clearcoat materials may comprise the above-described crosslinking agents, especially tris(alkoxycarbonylamino)triazines.

Examples of suitable powder slurry clearcoat materials are known, for example, from the U.S. Pat. No. 4,268,542 and the German patent applications DE-A-195 18 392.4 and DE-A-196 13 547, or are described in the German patent application DE-A-198 14 471.7, unpublished at the priority date of the present specification.

Powder slurry clearcoat materials conventionally comprise the above-described powder clearcoat materials in dispersion in an aqueous medium.

UV-curable clearcoat materials are disclosed, for example, in the patents EP-A-0 540 884, EP-A-0 568 967, and U.S. Pat. No. 4,675,234.

They are known to comprise low molecular mass, oligomeric and/or polymeric compounds curable with actinic light and/or electron beams, preferably radiation-curable binders, based in particular on ethylenically unsaturated prepolymers and/or ethylenically unsaturated oligomers, plus, if desired, one or more reactive diluents and, if desired, one or more photoinitiators. Examples of suitable radiation-curable binders are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders that are free from aromatic structural units.

Suitable radiation-curable reactive diluents include low molecular mass polyfunctional ethylenically unsaturated compounds. Examples of suitable such compounds are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

The above-described constituents of the clearcoat materials may be combined with one another so as to give one-component (1K), two-component (2K) or multicomponent (3K, 4K) clearcoat materials, powder clearcoat materials and powder slurry clearcoat materials which are curable thermally and/or with actinic radiation.

Furthermore, the clearcoat materials may comprise customary and known additives.

Examples of suitable additives are UV absorbers; free-radical scavengers; rheological aids; silicas; colloidal metal hydroxides containing blocked isocyanate groups, as described for example in the patent EP-A-0 872 500; slip additives; polymerization inhibitors; defoamers; leveling agents; biocides; flame retardants or film-forming auxiliaries such as cellulose derivatives. It is important that these additives do not adversely affect the transparency and other particular advantageous properties of the clearcoats, but instead improve and vary them advantageously. Further examples of suitable additives are disclosed by the patent U.S. Pat. No. 5,605,695.

The preparation of the coating materials of the invention, or of the clearcoat materials of the invention, from their constituents has no special features but instead takes place in a customary and known manner by mixing the constituents in appropriate mixing equipment such as dissolvers.

The further key constituent of the multicoat system of the invention is the basecoat (A).

The basecoat (A) can be produced from a coating material (A), preferably an aqueous coating material (A), in particular an aqueous basecoat material (A), and constitutes the color and/or effect constituent of the multicoat system of the invention.

The aqueous basecoat material (A) used with particular preference in accordance with the invention comprises, as is known, the following key components in dispersion in water:

(A1) at least one anionically and/or nonionically stabilized polyurethane, and (A2) at least one color and/or effect pigment.

Examples of suitable color and/or effect pigments (A2) are metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example. Examples of suitable inorganic color pigments (A2) are titanium dioxide, iron oxides, Sicotrans yellow, and carbon black. Examples of suitable organic color pigments (A2) are indanthrene blue, Cromophthal red, Irgazine orange, and Heliogen green.

The coating material of the invention may further comprise organic and inorganic fillers (A3) in customary and known, effective amounts. Examples of suitable fillers are chalk, calcium sulfates, barium sulfate, silicates such as talc or kaolin, silicas, oxides such as aluminum hydroxide or magnesium hydroxide, nanoparticles, or organic fillers such as textile fibers, cellulose fibers, polyethylene fibers, or wood flour.

The coating material of the invention further comprises coatings additives (A4) in customary and known, effective amounts.

Examples of suitable additives (A4) are those mentioned above.

Further examples of suitable additives (A4) are rheology control additives such as those known from the patents WO 94/22968, EP-A-0 276 501, EP-A-0 249 201, and WO 97/12945; crosslinked polymeric microparticles, as disclosed, for example in EP-A-0 008 127; inorganic phyllosilicates such as aluminum magnesium silicates, sodium magnesium and sodium magnesium fluorine lithium phyllosilicates of the montmorillonite type; silicas such as Aerosils; or synthetic polymers containing ionic and/or associative groups such as polyvinyl alcohol, poly(meth) acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates. Preferred rheology control additives (A4) used are polyurethanes and/or phyllosilicates.

Moreover, the aqueous basecoat material (A), if it is not to be cured by physical drying alone, may comprise effective amounts of at least one crosslinking agent (A5).

Examples of suitable crosslinking agents (A5) are the above-described crosslinking agents which are suitable for use in one-component (1K) clearcoat materials. Where the aqueous basecoat material (A) is configured as a two-component (2K) or multicomponent (3K, 4K) clearcoat material, it comprises the above-described polyepoxides and/or the above-described unblocked polyisocyanates.

Numerous examples of suitable anionically and/or nonionically stabilized polyurethanes (A1) and also numerous examples of suitable compositions of aqueous basecoat materials (A) are disclosed in the patents

| EP-A-0 089 497, | EP-A-0 256 540, | EP-A-0 260 447, |
|---|---|---|
| EP-A-0 297 576, | WO 96/12747, | EP-A-0 523 610, |
| EP-A-0 228 003, | EP-A-0 397 806, | EP-A-0 574 417, |
| EP-A-0 531 510, | EP-A-0 581 211, | EP-A-0 708 788, |
| EP-A-0 593 454, | DE-A-43 28 092, | EP-A-0 299 148, |
| EP-A-0 394 737, | EP-A-0 590 484, | EP-A-0 234 362, |
| EP-A-0 234 361, | EP-A-0 543 817, | WO 95/14721, |
| EP-A-0 521 928, | EP-A-0 522 420, | EP-A-0 522 419, |
| EP-A-0 649 865, | EP-A-0 536 712, | EP-A-0 596 460, |
| EP-A-0 596 461, | EP-A-0 584 818, | EP-A-0 669 356, |
| EP-A-0 634 431, | EP-A-0 678 536, | EP-A-0 354 261, |
| EP-A-0 424 705, | WO 97/49745, | WO 97/49747, and |
| EP-A-0 401 565. | | |

Viewed in terms of its method, the preparation of the aqueous basecoat material (A) has no special features but instead takes place in accordance with the customary and known methods by mixing the components in suitable mixing equipment such as dissolvers.

The multicoat system of the invention may be produced by a very wide variety of processes. It is of advantage to produce it by the process of the invention.

The process of the invention starts from the substrate that is to be coated. The substrate may be of metal, wood, plastic, glass or paper, or may include these substances as composites. Preferably, it comprises automobile body parts or industrial components, including containers, made of metal.

The substrate may have been provided with a primer. In the case of plastics, this is a water-based primer which is cured prior to the application of the basecoat material (A), especially the aqueous basecoat material (A). In the case of metals, especially automobile body Darts, the primer comprises customary and known cured electrocoats to which a primer-surfacer is applied and baked.

In accordance with the inventive procedure, the basecoat material (A) is applied in a process step (I) to the surface of the substrate and is dried (process step II) but not cured.

In a process step (III), a first clearcoat material (B), which subsequently forms the intermediate coat, is applied to the surface of the basecoat film.

In process step (IV), the films (A) and (B) are cured together (wet-on-wet technique). In this case, depending on its composition, the film (B) may be cured thermally and/or with actinic radiation. Regarding the thermal curing, the baking temperature is guided in particular by whether the coating materials (A) and (B) are one-component (1K) or two-component (2K) or multicomponent (3K, 4K) systems.

In the case of one-component (1K) systems, baking temperatures generally employed are above 120° C. In the case of two-component (2K) or multicomponent (3K, 4K) systems, the baking temperatures are customarily below 100° C., in particular below 80° C.

In accordance with the invention, in process step (V), the clearcoat film (C) is applied to the surface of the clearcoat film (B) and, in process step (VI), is cured. Curing is carried out using the methods described above, depending on the clearcoat material (C) used. This variant of the process of the invention is significant in particular in the case of automotive refinish. Sanding of the clearcoat (B) for the purpose of improving the intercoat adhesion is no longer necessary.

As an alternative to this variant of the process of the invention, the clearcoat film (B) applied in process step (III) is merely dried in process step (IV). Thereafter, in process step (V), the clearcoat film (C) is applied wet-on-wet, after which the coating films (A), (B) and (C) are cured together.

In the process of the invention, the coating materials (A), (B) and (C) may be applied to the substrates by customary application methods, such as spraying, knifecoating, brushing, flowcoating, dipping, or rolling, for example. For curing, the customary and known methods may be employed, such as heating in a forced-air oven, irradiation with IR lamps and, if desired, with UV lamps.

Within the multicoat system of the invention, the thickness of the individual coats (A), (B) and (C) may vary widely. In accordance with the invention, however, it is of advantage if the basecoat (A) has a thickness of from 5 to 25 μm, in particular from 7 to 15 μm, and the two clearcoats (B) and (C) have an overall thickness of from 15 to 120 μm, preferably from 40 to 80 μm, and in particular from 60 to 70 μm. The proportion of the coat thicknesses may vary widely; however, it is of advantage for reasons including those of economics if the clearcoat (B) is the thicker of the two coats. This clearcoat (B) may then, so to speak, provide the basic properties of the multicoat clearcoat, with the particularly desired performance properties being set by way of the clearcoat (C) with its different, possibly specially selected composition.

The multicoat system of the invention possesses outstanding optical, mechanical, and chemical properties. Thus it is free from any surface defects such as shrinkage (wrinkling). It is of outstanding transparency and scratch resistance. Delamination owing to deficient intercoat adhesion is not observed. The etch resistance is outstanding. The very particular advantage of the multicoat system of the invention is that the profile of properties of its surface can be varied in an especially broad way and can therefore be tailored, simply and precisely, to a very wide variety of requirements.

EXAMPLES AND COMPARATIVE EXPERIMENTS

Preparation Examples 1 to 6

1. The Preparation of a Polyacrylate

A laboratory reactor with a useful volume of 4 l, equipped with a stirrer, two dropping funnels for the monomer mixture and initiator solution, respectively, a nitrogen inlet pipe, thermometer and reflux condenser was charged with 640.6 g of an aromatic hydrocarbon fraction having a boiling range of 158–172° C. The solvent was heated to 140° C. After it had reached 140° C., a monomer mixture of 597 g of ethylhexyl acrylate, 173.2 g of hydroxyethyl methacrylate, 128.4 g of styrene and 385.2 g of 4-hydroxybutyl acrylate was metered into the reactor at a uniform rate over the course of 4 hours and an initator solution of 25.6 g of t-butyl perethylhexanoate in 50 g of the aromatic solvent described was metered into the reactor at a uniform rate over the course of 4.5 hours. The metering of the monomer mixture and of the initiator solution was commenced simultaneously. After the end of the metering of initiator, the reaction mixture was held at 140° C. for two hours more and then cooled. The resulting polymer solution had a solids content of 65%, determined in a forced air oven at 130° C. for 1 h.

2. The Preparation of a Polyacrylate as Grinding Resin

A laboratory reactor with a useful volume of 4 l, equipped with a stirrer, two dropping funnels for the monomer mixture and initiator solution, respectively, a nitrogen inlet pipe, thermometer and reflux condenser was charged with 720 g of an aromatic hydrocarbon fraction having a boiling range of 158–172° C. The solvent was heated to 140° C. After it had reached 140° C., a monomer mixture of 450 g of 2-ethylhexyl methacrylate, 180 g of n-butyl methacrylate, 210 g of styrene, 180 g of hydroxyethyl acrylate, 450 g of 4-hydroxybutyl acrylate and 30 g of acrylic acid was metered into the reactor at a uniform rate over the course of 4 hours and an initator solution of 150 g of t-butyl perethylhexanoate in 90 g of the aromatic solvent described was metered into the reactor at a uniform rate over the course of 4.5 hours. The metering of the monomer mixture and of the initiator solution was commenced simultaneously. After the end of the metering of initiator, the reaction mixture was held at 140° C. for two hours more and then cooled. The resulting polymer solution had a solids content of 65%, determined in a forced air oven at 130° C. for 1 h, an acid number of 15 and a viscosity of 3 dPas (measured on a 60% dilution of the polymer solution in the aromatic solvent described, using an ICI cone and plate viscometer at 23° C.).

3. The Preparation of a Thixotropizing Paste 800 g of millbase, consisting of 323.2 g of the polyacrylate from preparation example 2, 187.2 g of butanol, 200.8 g of xylene and 88.8 g of Aerosil® 812 (Degussa AG, Hanau) together with 1100 g of quartz sand (grain size 0.7–1 mm), were weighed out into a stirred laboratory mill from Vollrath and the batch was dispersed for 30 minutes with water cooling.

4. The Preparation of a Crosslinking Agent

A 4 l stainless steel reactor with stirrer, reflux condenser, thermometer, oil heating and a feed vessel for the blocking agent was charged with 41.76 parts by weight of Vestanat$^R$ 1890 (isocyanurate based on isophoron diisocyanate, from Creanova) and 20.76 parts by weight of solvent naphtha, and this initial charge was heated to 50° C. Over the course of four hours, 23.49 parts by weight of diethyl malonate, 5.81 parts by weight of ethyl acetoacetate and 0.14 part by weight of catalyst solution (sodium ethylhexanoate) were metered in at a uniform rate. After the end of the feed, a further 0.14 part by weight of catalyst solution was added. Thereafter, the temperature was raised to 80° C. When an isocyanate equivalent weight of from 5 900 to 6 800 had been reached, 0.9 part by weight of 1,4-cyclohexyldimethanol was added at 80° C. over the course of 30 minutes with stirring. After an isocyanate equivalent weight of ≧13 000 had been reached, 5 parts by weight of n-butanol were added. The temperature was lowered to 50° C. and the resulting blocked polyisocyanate was diluted with 2 parts by weight of n-butanol to a theoretical solids content of 68% by weight. The blocked polyisocyanate thus obtained had a solids content of 74.5% by weight (one hour; 130° C.) and an original viscosity of 41.6 dPas.

5. The Preparation of a Further Conventional Polyacrylate

A laboratory reactor with a useful volume of 4 l, equipped with a stirrer, two dropping funnels for the monomer mixture and initiator solution, respectively, a nitrogen inlet pipe, thermometer and reflux condenser was charged with 720 g of an aromatic hydrocarbon fraction having a boiling range of 158–172° C. The solvent was heated to 140° C. After it had reached 140° C., a monomer mixture of 427.5 g of n-butyl acrylate, 180 g of n-butyl methacrylate, 450 g of styrene, 255 g of hydroxyethyl acrylate, 165 g of 4-hydroxybutyl acrylate and 22.5 g of acrylic acid was metered into the reactor at a uniform rate over the course of 4 hours and an initator solution of 120 g of t-butyl perethylhexanoate in 90 g of the aromatic solvent described was metered into the reactor at a uniform rate over the course of 4.5 hours. The metering of the monomer mixture and of the initiator solution was commenced simultaneously. After the end of the metering of initiator, the reaction mixture was held at 140° C. for two hours more and then cooled. The resulting polymer solution had a solids content of 60%, determined in a forced air oven at 130° C. for 1 h, an acid number of 13 mg KOH/g, an OH number of 116 mg KOH/g, a glass transition temperature Tg of 3.23° C. and a viscosity of 9 dPas (measured on a 60% dilution of the polymer solution in the aromatic solvent described, using an ICI cone and plate viscometer at 23° C.).

6. The Preparation of a Solution of Tricyclodecanedimethanol 312 g of tricyclodecanedimethanol were mixed with 83 g of butyl diglycol acetate and the mixture was heated with stirring until a homogeneous solution had developed. The concentration of the solution was 79% by weight.

Example 1 and Comparative Experiment C1

The Preparation of an Inventive One-component Clearcoat Material (Example 1) and of a Noninventive One-component Clearcoat Material (Comparative Experiment C1)

An inventive one-component clearcoat material (example 1) and a conventional one-component clearcoat material (comparative experiment C1) were prepared from the constituents listed in table 1, by mixing.

TABLE 1

Composition of the inventive one-component clearcoat material (example 1) and of the conventional one-component clearcoat material (comparative experiment C1)

| Constituents | Comparative exp. C1 (parts by weight) | Example 1 (parts by weight) |
|---|---|---|
| Polyacrylate from preparation example 4 | 43.4 | 43.4 |
| Crosslinking agent from preparation example 5 | 9.0 | 9.0 |
| Commercially customary butanol-etherified melamine-formaldehyde resin (60% in butanol/xylene) | 16.0 | 16.0 |
| Setalux ® C91756 (commercial thixotropic agent from Akzo) | 13.5 | 13.5 |
| Substituted hydroxyphenyl-triazine (65% in xylene) (Cyagard ® 1164 L) | 0.6 | 0.6 |
| Aminoether-modified 2,2,6,6-tetramethylpiperydinyl ester (Tinuvin ® 123 from Ciba) | 0.8 | 0.8 |
| Byk ® 390 (Byk Chemie) | 0.05 | 0.05 |
| Byk ® 310 (Byk Chemie) | 0.15 | 0.15 |
| Tego ® LAG 502 | 0.2 | 0.2 |
| Butanol | 11.4 | 11.4 |
| Solventnaphtha ® | 2.5 | 2.5 |
| Xylene | 0.9 | 0.9 |
| Butyl diglycol acetate | 1.5 | 1.5 |
| Tricyclodecanedimethanol from preparation example 6 | — | 6.0 |
| TOTAL | 100 | 106 |

The clearcoat material of comparative experiment C1 had an efflux time of 46 s in the DIN4 cup at 21° C. For an application, it was adjusted using 8 parts by weight of a diluent (organic solvent mixture) to an efflux time of 28 s.

The clearcoat material of example 1 had an efflux time of 51.5 s in the DIN4 cup at 21° C. For an application, it was adjusted using 10 parts by weight of a diluent (organic solvent mixture) to an efflux time of 28 s.

Example 2 and Comparative Experiment C2

The Production of an Inventive Multicoat Paint System ML (Example 2) and of a Noninventive Multicoat Paint System (Comparative Experiment C2)

To produce the inventive multicoat paint system ML of example 2 and the noninventive multicoat paint system of comparative experiment C2, first of all an overcoat clearcoat material was prepared by mixing the constituents indicated in table 2.

TABLE 2

Composition of the overcoat clearcoat material

| Constituents | (Parts by weight) |
|---|---|
| Binder | |
| Polyacrylate from preparation example 1 | 50.0 |
| Thixotroping paste from preparation example 3 | 3.0 |
| Crosslinking agent | |
| TACT | 26.6 |
| Further constituents | |
| Substituted hydroxyphenyl-benzotriazole (95% in xylene) (Tinuvin ® 292 from Ciba) | 1.0 |
| Aminoether-modified 2,2,6,6-tetramethylpiperydinyl ester (Tinuvin ® 400 from Ciba) | 1.2 |
| Commercial solution of a polyether-modified polydimethylsiloxane (5% in xylene) Byk ® 310 (Byk Chemie) | 1.4 |
| Butyl diglycol acetate | 5.5 |
| Butyl glycol acetate | 5.5 |
| Solvesso ® 150 | 5.8 |
| TOTAL | 100 |

TACT=commercial tris(alkoxycarbonylamino)triazine from CYTEC

The overcoat clearcoat material had an efflux time in the DIN4 cup at 21° C. of 28 s.

To produce the test panels, an electrocoat material (dry film thickness 22 μm) and an aqueous primer-surfacer (FU63-9400 from BASF Coatings AG) were applied in succession and baked (dry film thickness 30 μm). The electrocoat material was baked at 170° C. for 20 minutes and the primer-surfacer at 160° C. for 20 minutes. Then a blue aqueous basecoat material (Wasser-Percolor-Basislack FW 05-513P from BASF Coatings AG) was applied with a film thickness of 15–18 μm and was flashed off at 80° C. for 10 minutes.

Thereafter, for example 2 the one-component clearcoat material of example 1, and for comparative experiment C2 the one-component clearcoat material from comparative experiment C1 (cf. table 1), were applied wet-on-wet and were baked at 135° C. for 30 minutes so as to give dry film thicknesses of 35 μm.

The test panels obtained in this way were further coated, without intermediate sanding, with the overcoat clearcoat material (cf. table 2). The resultant clearcoat films were baked at 140° C. for 20 minutes, giving dry film thicknesses of 20 μm.

The adhesion of the inventive multicoat paint system ML of example 2 was determined following 24 hours of storage at room temperature by the cross-hatch test in accordance with DIN 53151 (2 mm) [rating 0 to 5]. There was no delamination: rating GT0. In contrast, in the case of the noninventive multicoat paint system of comparative experiment C2, there was delamination of the clearcoat: rating GT4.

Furthermore, the adhesion properties of the inventive multicoat paint system ML of example 2 and of the noninventive multicoat paint system of comparative experiment C2 were determined by means of the cross-hatch test following exposure to condensation. The results are given in table 3. They again underline the superior adhesive strength of the inventive multicoat paint system ML.

TABLE 3

Constant condensation climate test (CC test)[a] and adhesion properties of the inventive multicoat paint system ML of example 2 and of the multicoat paint system of comparative experiment 2

| | Example 2 | Comparative exp. 2 |
| --- | --- | --- |
| Adhesion by the cross-cut test[b] | GT1 | GT5 |

[a]Customary method of evaluating the resistance of paint materials to exposure to long-term humidity (240 hours, 100% rel. humidity, 40° C., details in the test specification MKK0001A, issue A/14.05.1996, available from BASF Coatings AG). The evaluation is made one hour after the end of condensation exposure.
[b]Cross-cut in accordance with DIN 53151 (2 mm) after 240 hours of SCC and 24 hours of regeneration; rating 0 to 5: 0 = best score; 5 = worst score.

What is claimed is:

1. A coating composition comprising at least one binder, at least one crosslinking agent, and tricyclodecanedimethanol, wherein the binder comprises at least one of:
   (i) a binder that contains at least two groups, wherein the groups are at least one of lateral and terminal, and wherein the groups are at least one of a carbanate group and an allophanate group, and wherein the binder that contains at least two groups is at least one of an oligomer and a polymer, and
   (ii) a polyacrylate resin that has an OH number of from 80 to 200 mg KOH/g and an acid number of less than 20 mg KOH/g.

2. The coating composition of claim 1, comprising tricyclodecanedimethanol in an amount of from 0.2 to 20% by weight based on the coating composition.

3. The coating composition of claim 2, comprising tricyclodecanedimethanol in an amount of from 1.0 to 7.0% by weight, based on the coating composition.

4. The coating composition of claim 3, comprising tricyclodecanedimethanol in an amount of from 2.0 to 5.0% by weight, based on the coating composition.

5. The coating composition of claim 1, wherein the binder comprises the binder that contains the at least two groups.

6. A method for improving the intercoat adhesion of a multicoat coating system having at least two coats, comprising adding tricyclodecanedimethanol to at least one coating compositions used to produce at least one coat of the multicoat coating system, wherein the coating composition comprises a binder that comprises at least one of:
   (i) a binder that contains at least two groups, wherein the groups are at least one of lateral and terminal, and wherein the groups are at least one of a carbamate group and an allophanate group, and wherein the binder that contains at least two groups is at least one of an oligomer and a polymer, and
   (ii) a polyacrylate resin that has an OH number of from 80 to 200 mg KOH/g and an acid number of less than 20 mg KOH/g.

7. The method of claim 6, comprising adding tricyclodecanedimethanol in an amount of from 0.2 to 20% by weight based on the coating composition.

8. The method of clam 7, comprising adding tricyclodecanedimethanol in an amount of from 1.0 to 7.0% by weight, based on the coating composition.

9. The method of claim 8, comprising adding tricyclodecanedimethanol in an amount of from 2.0 to 5.0% by weight, based on the coating composition.

10. The method of claim 6, wherein the binder comprises the binder that contains the at least two groups.

11. A multicoat coating system on a substrate, comprising
   (A) a coat adjacent to the substrate resulting from the application of a basecoat coating composition,
   (B) an intermediate coat resulting from the application of a first coating composition (B), and
   (C) a topmost coat resulting from the application of a second coating composition (C),
      wherein at least one of the coating compositions (B) or (C) comprises tricyclodecanedimethanol and a binder that comprises at least one of:
         (i) a binder that contains at least two groups, wherein the groups are at least one of lateral and terminal, and wherein the groups are at least one of a carbamate group and an allophanate group, and wherein the binder that contains at least two groups is at least one of an oligomer and a polymer, and
         (ii) a polyacrylate resin that has an OH number of from 80 to 200 mg KOH/g and an acid number of less than 20 mg KOH/g.

12. The multicoat coating system of claim 11, wherein the coating compositions (B) and (C) are different.

13. The multicoat coating composition of claim 11 wherein the first and second coating compositions (B) and (C) are clearcoat coating compositions.

14. The multicoat coating system of claim 11, wherein the binder comprises the binder that contains the at least two groups.

15. A process for producing a multicoat coating system, comprising:

(I) applying a basecoat coating composition (A) to a substrate, (II) drying the applied basecoat coating composition (A), (III) applying to the dried basecoat a first coating composition (B), (IV) curing together the dried basecoat (A) and applied first coating composition (B), (V) applying a second coating composition (C) to the cured first coating (B), and (VI) curing the applied second coating composition (C), or alternatively (I) applying the basecoat coating composition (A) to a substrate, (II) drying the applied basecoat coating composition (A), (III) applying the first coating composition (B) to the dried applied basecoat (A), (IV) drying the applied coating composition (B), (V) applying a second coating composition (C) to the dried coating composition (B), and (VI) curing together the applied and dried coating compositions (A), (B), and (C), wherein at least one of the coating compositions (B) or (C) comprises tricyclodecanedimethanol and a binder that contains at least one of:
(i) a binder that contains at least two groups, wherein the groups are at least one of lateral and terminal, and wherein the groups are at least one of a carbamate group and an allophanate group, and wherein the binder that contains at least two groups is at least one of an oligomer and a polymer, and
(ii) a polacrylate resin that has an OH number of from 80 to 200 mg KOH/g and an acid number of less than 20 mg KOH/g.

16. A coated substrate having a multicoat coating system thereon, said coated substrate being produced by the process of claim 15.

17. The coated substrate of claim 16 which is a component of an automobile body.

18. The process of claim 15 wherein the substrate is unprimed.

19. The process of claim 18 further comprising coating the substrate prior to the application of the basecoat coating composition.

20. The process of claim 18 further comprising priming the substrate prior to the application of the basecoat coating composition.

21. The method of claim 15 wherein the first and second coating compositions (B) and (C) are clearcoat coating compositions.

22. The process of claim 15, wherein the binder comprises the binder that contains the at least two groups.

23. A process for producing a multicoat coating system, comprising:
(I) applying a basecoat coating composition (A) to a substrate to produce a basecoat coated substrate,
(II) applying to the basecoat coated substrate a first coating composition (B) to produce a first coated substrated,
(III) applying a second coating composition (C) to the first coated substrate to the first coated substrate to produce a second coated substrate, and
(IV) curing the second coated substrate,
wherein at least one of the coating compositions (B) and (C) comprises tricyclodecanedimethanol and a binder that comprises at least one of:
(i) a binder that contains at least two groups, wherein the groups are at least one of lateral and terminal, and wherein the groups are at least one of a carbamate group and an allophanate group, and wherein the binder that contains at least two groups is at least one of an oligomer and a polymer, and
(ii) a polyacrylate resin that has an OH number of from 80 to 200 mg KOH/g and an acid number of less than 20 mg KOH/g.

24. The process of claim 23 wherein one or more of the applied coating compositions (A) and (B) are dried before the application of a subsequent coating composition.

25. The process of claim 23 wherein one or more of the applied coating compositions (A) and (B) are cured before the application of a subsequent coating composition.

26. The process of claim 23, wherein the binder comprises the binder that contains the at least two groups.

* * * * *